(12) United States Patent
Kerofsky et al.

(10) Patent No.: US 12,489,894 B2
(45) Date of Patent: Dec. 2, 2025

(54) CONTENT ADAPTIVE TRANSFORM PRECISION FOR VIDEO CODING

(71) Applicant: InterDigital VC Holdings, Inc., Wilmington, DE (US)

(72) Inventors: Louis Kerofsky, San Diego, CA (US); Yuwen He, San Diego, CA (US); Philippe Hanhart, La Conversion (CH)

(73) Assignee: InterDigital VC Holdings, Inc., Wilmington, DE (US)

( * ) Notice: Subject to any disclaimer, the term of this patent is extended or adjusted under 35 U.S.C. 154(b) by 105 days.

(21) Appl. No.: 17/442,699

(22) PCT Filed: Mar. 25, 2020

(86) PCT No.: PCT/US2020/024706
§ 371 (c)(1),
(2) Date: Sep. 24, 2021

(87) PCT Pub. No.: WO2020/198352
PCT Pub. Date: Oct. 1, 2020

(65) Prior Publication Data
US 2022/0132123 A1   Apr. 28, 2022

Related U.S. Application Data

(60) Provisional application No. 62/823,738, filed on Mar. 26, 2019.

(51) Int. Cl.
*H04N 19/12* (2014.01)
*H04N 19/126* (2014.01)
(Continued)

(52) U.S. Cl.
CPC ........... *H04N 19/12* (2014.11); *H04N 19/126* (2014.11); *H04N 19/14* (2014.11); *H04N 19/176* (2014.11); *H04N 19/18* (2014.11); *H04N 19/60* (2014.11)

(58) Field of Classification Search
CPC ...... H04N 19/86; H04N 19/117; H04N 19/61; H04N 19/176; H04N 19/30; H04N 19/70;
(Continued)

(56) References Cited

U.S. PATENT DOCUMENTS 8,923,406 B2   12/2014   Mrak et al.
10,327,008 B2   6/2019   Chien et al.
(Continued)

FOREIGN PATENT DOCUMENTS

CN   103202016 A   7/2013
CN   103404141 A   11/2013
(Continued)

OTHER PUBLICATIONS

Bordes et al., "Description of SDR, HDR and 360° Video Coding Technology Proposal by Qualcomm and Technicolor—Medium Complexity Version", JVET-J0022R1, Qualcomm, Technicolor, Joint Video Experts Team (JVET) of ITU-T SG 16 WP 3 and ISO/IEC JTC 1/SC 29/WG 11, 10th Meeting: San Diego, US, Apr. 10-20, 2018, 83 pages.
(Continued)

*Primary Examiner* — Farhan Mahmud
(74) *Attorney, Agent, or Firm* — Condo Roccia Koptiw LLP

(57) ABSTRACT

Systems, methods, and instrumentalities are disclosed for obtaining coded video data comprising quantized transform coefficients for a plurality of blocks, obtaining a first precision factor associated with a first block for performing at least one decoding function on the first block, obtaining a second precision factor associated with a second block for performing the at least one decoding function on the second block, and performing the at least one decoding function on the quantized transform coefficients for the first block using the first precision factor and on the quantized transform (Continued)

coefficients for the second block using the second precision factor.

18 Claims, 12 Drawing Sheets

(51) Int. Cl.
*H04N 19/14* (2014.01)
*H04N 19/176* (2014.01)
*H04N 19/18* (2014.01)
*H04N 19/60* (2014.01)

(58) Field of Classification Search
CPC .... H04N 19/124; H04N 19/103; H04N 19/44; H04N 19/46; H04N 21/23439; H04N 19/85; H04N 19/895; H04N 21/23655; H04N 19/196; H04N 21/6131
See application file for complete search history.

(56) References Cited

U.S. PATENT DOCUMENTS

| | | | |
|---|---|---|---|
| 10,575,015 | B2 | 2/2020 | Lee et al. |
| 2017/0093434 | A1* | 3/2017 | Greenebaum ........ G09G 3/2044 |
| 2019/0052878 | A1 | 2/2019 | Zhao et al. |
| 2020/0014956 | A1* | 1/2020 | Rosewarne .......... H04N 19/146 |
| 2021/0029369 | A1* | 1/2021 | Sjöberg ................ H04N 19/115 |
| 2021/0099721 | A1* | 4/2021 | Tsukuba ............... H04N 19/184 |

FOREIGN PATENT DOCUMENTS

| | | |
|---|---|---|
| CN | 105120272 A | 12/2015 |
| CN | 109076225 A | 12/2018 |

OTHER PUBLICATIONS

Dong et al., "Non-CE5: Improved Transform Skipping Mode", JCTVC-H0141, InterDigital Communication, LLC, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-4.

Fuldseth et al., "Transform Design for HEVC with 16 Bit Intermediate Data Representation", JCTVC-E243, Cisco Systems, Texas Instruments Inc., Joint Collaborative Team on Video Coding (JCT-VC) of ITU-T SG16 WP3 and ISO/IEC JTC1/SC29/WG11, 5th Meeting: Geneva, CH, Mar. 16-23, 2011, pp. 1-12.

ISO/IEC, "High Efficiency Video Coding", Rec. ITU-T H.265 and ISO/IEC 23008-2, Apr. 2013, 317 pages.

ITU-T, "Advanced Video Coding for Generic Audiovisual Services", Recommendation H.264 and ISO/IEC 14496-10, Series H: Audiovisual and Multimedia Systems, Infrastructure of Audiovisual Services—Coding of Moving Video, May 2003, 282 pages.

ITU-T, "Generic Coding of Moving Pictures and Associated Audio Information—Part 2: Video", International Standard 13818-2, Recommendation ITU-T H.262, International Organization for Standardization (ISO) and the International Electrotechnical Commission (IEC), 1994, 212 pages.

ITU-T, "Line Transmission on Non-Telephone Signals—Video Codec for Audiovisual Services at p×64 Kbit/Sec", CCITT, Recommendation H.261, Geneva, 1990, 32 pages.

Kerofsky et al., "Transform Dynamic Range Analysis", JCTVC-E333, Sharp Labs of America, Joint Collaborative Team on Video Coding (JCT-VC) of ITU-T SG16 WP3 and ISO/IEC JTC1/SC29/WG11, 5th Meeting: Geneva, Mar. 16-23, 2011, pp. 1-5.

Kerofsky, Louis, "16-Bit DC Coefficient Reconstruction", JVT-1025, Sharp Labs of America, Joint Video Team (JVT) of ISO/IEC MPEG and ITU-T VCEG (ISO/IEC JTC1/SC29/WG11 and ITU-T SG16 Q.6), 7th Meeting: San Diego, California, USA, Sep. 2-5, 2003, pp. 1-6.

Kerofsky, Louis, "Notes on JVT IDCT", JVT-C24, Sharp Labs of America, Joint Video Team (JVT) of ISO/IEC MPEG & ITU-T VCEG (ISO/IEC JTC1/SC29/WG11 and ITU-T SG16 Q.6), 3rd Meeting: Fairfax, Virginia, USA, May 6-10, 2002, pp. 1-8.

Yeo et al., "Dynamic Range Analysis in High Efficiency Video Coding Residual Coding and Reconstruction", IEEE Transactions on Circuits and Systems for Video Technology, vol. 23, No. 7, Jul. 2013, pp. 1131-1136.

* cited by examiner

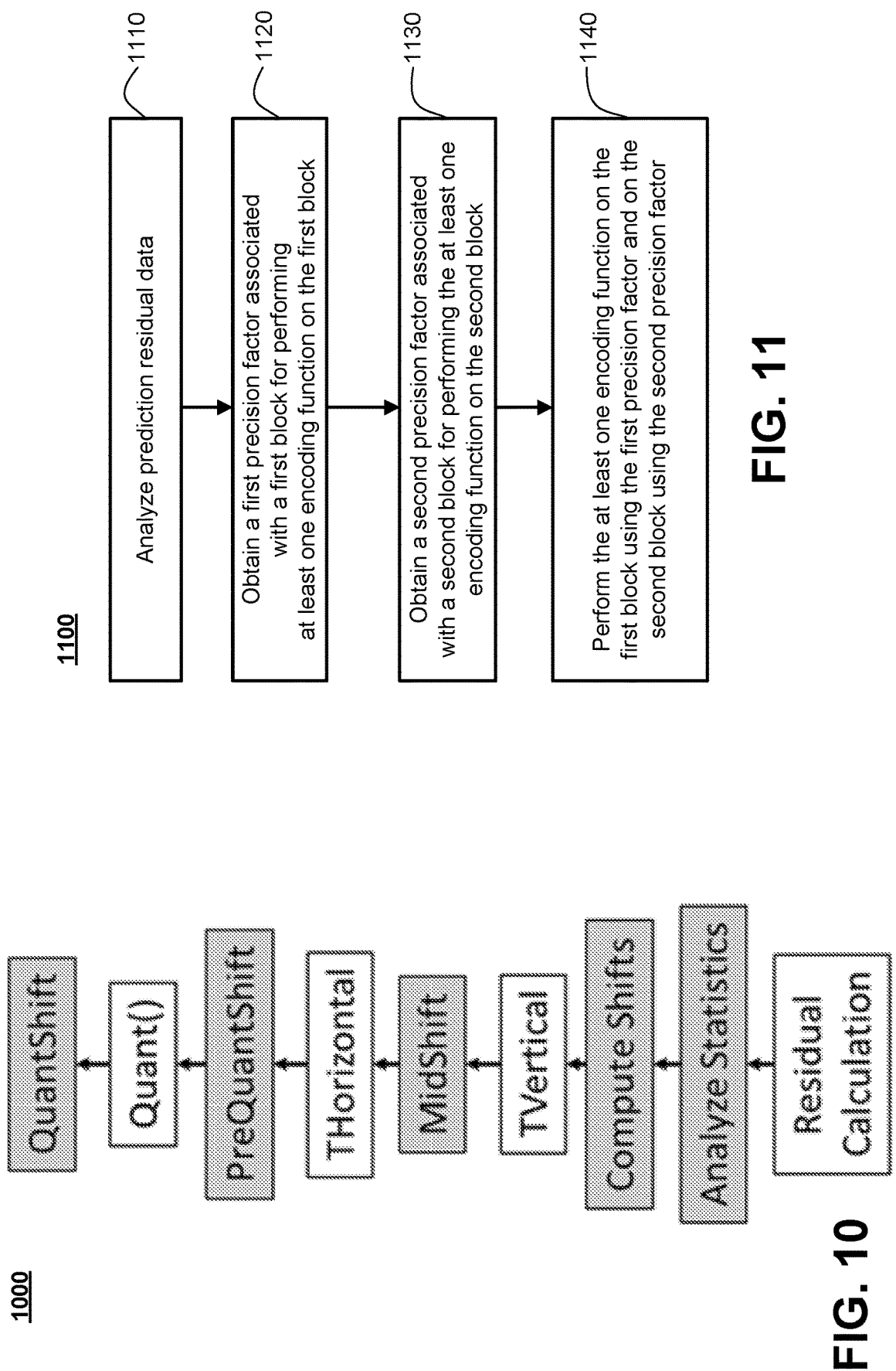

CONTENT ADAPTIVE TRANSFORM PRECISION FOR VIDEO CODING

CROSS-REFERENCE TO RELATED APPLICATION

This application is the National Stage Entry under 35 U.S.C. § 371 of Patent Cooperation Treaty Application No. PCT/US2020/024706, filed Mar. 25, 2020, which claims priority to U.S. Ser. No. 62/823,738, filed Mar. 26, 2019, the entirety of which is incorporated by reference herein.

BACKGROUND

Video coding systems may be used to compress digital video signals, e.g., to reduce the storage and/or transmission bandwidth needed for such signals.

SUMMARY

Systems, methods, and instrumentalities are disclosed for obtaining coded video data comprising quantized transform coefficients for a plurality of blocks, obtaining a first precision factor associated with a first block for performing at least one decoding function on the first block, obtaining a second precision factor associated with a second block for performing the at least one decoding function on the second block, and performing the at least one decoding function on the quantized transform coefficients for the first block using the first precision factor and on the quantized transform coefficients for the second block using the second precision factor.

The first precision factor (e.g., associated with the first block) and the second precision factor (e.g., associated with the second block) may be obtained from the coded video data. The first precision factor and the second precision factor may be obtained based on a magnitude of the transform coefficients for their respective blocks. The first precision factor and the second precision factor may be different (e.g., depending on the content of the respective blocks).

The at least one decoding function may comprise dequantization. The first precision factor may comprise a first dequantization shift. The second precision factor may comprise a second dequantization shift.

The at least one decoding function may comprise inverse transformation. The first precision factor may comprise a first mid-transform shift. The second precision factor may comprise a second mid-transform shift. Obtaining the first precision factor associated with the first block may comprise determining the mid-transform shift associated with the first block based on the bounds on an absolute magnitude of an output of a first inverse transform, and the at least one decoding function may comprise a second inverse transform.

The first precision factor may comprise a dequantization shift and a mid-transform shift. The mid-transform shift associated with the first block may be determined based on the dequantization shift associated with the first block. A normalization shift associated with the first block based on the dequantization shift and mid-transform shift associated with the first block may be obtained. Normalization processing on the first block using the normalization shift may be performed. A sum of the dequantization shift, the mid-transform shift, and the normalization shift may be a content independent value.

Systems, methods, and instrumentalities are disclosed for obtaining prediction residual data for a plurality of blocks of video data, analyzing the prediction residual data to determine a magnitude input to represent a block, determining a first precision factor associated with a first block for performing at least one encoding function on the first block, determining a second precision factor associated with a second block for performing the at least one encoding function on the second block, and performing the at least one encoding function on the input for the first block using the first precision factor and on the input for the second block using the second precision factor.

The at least one encoding function may comprise at least one of a horizontal transform or a quantization.

An indication of the first precision factor for the first block may be included in a bitstream representing the video data. And/or an indication of the second precision factor for the second block may be included in a bitstream representing the video data. The indication of the first precision factor may comprise a number of fraction bits for performing at least one decoding function.

Prediction residual data may be analyzed to determine a largest magnitude input (e.g. a magnitude input may be based on the largest magnitude of the residual coefficients associated with the block) to represent a block may be performed before vertical transformation.

The first precision factor and the second precision factor may be different.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

BRIEF DESCRIPTION OF THE DRAWINGS

FIG. 10 illustrates an example of a content adaptive transform precision (CATP) forward encoder.

FIG. 11 illustrates an example of a flow chart of an encoding operation according to the present disclosure.

DETAILED DESCRIPTION

A more detailed understanding may be had from the following description, given by way of example in conjunction with the accompanying drawings.

Figure 1A:
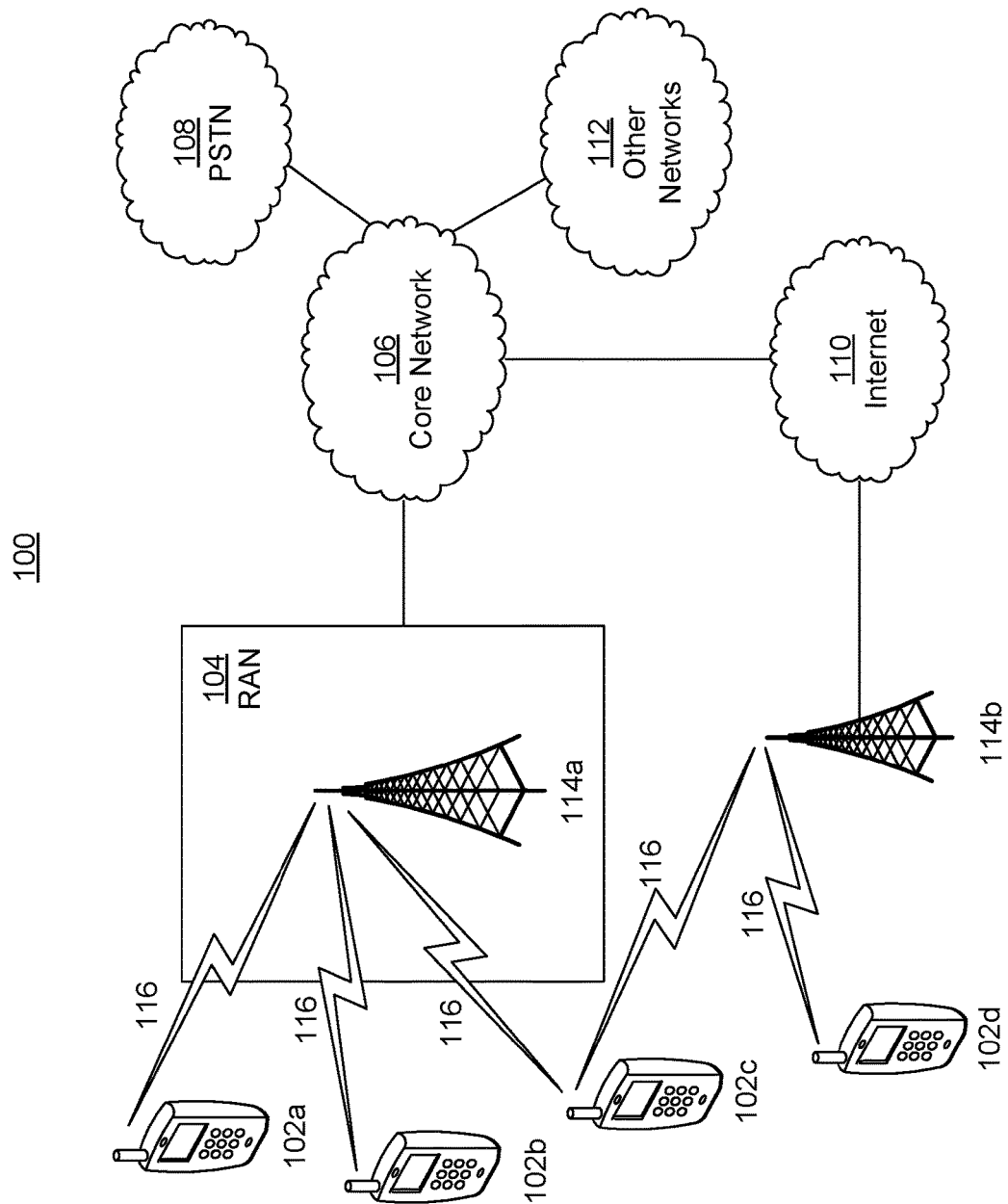
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a ON 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the ON 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over Internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TOP), user datagram protocol (UDP) and/or the internet protocol (IP) in the TCP/IP internet protocol suite. The networks 112 may include wired and/or wireless communications networks owned and/or operated by other service providers. For example, the networks 112 may include another ON connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
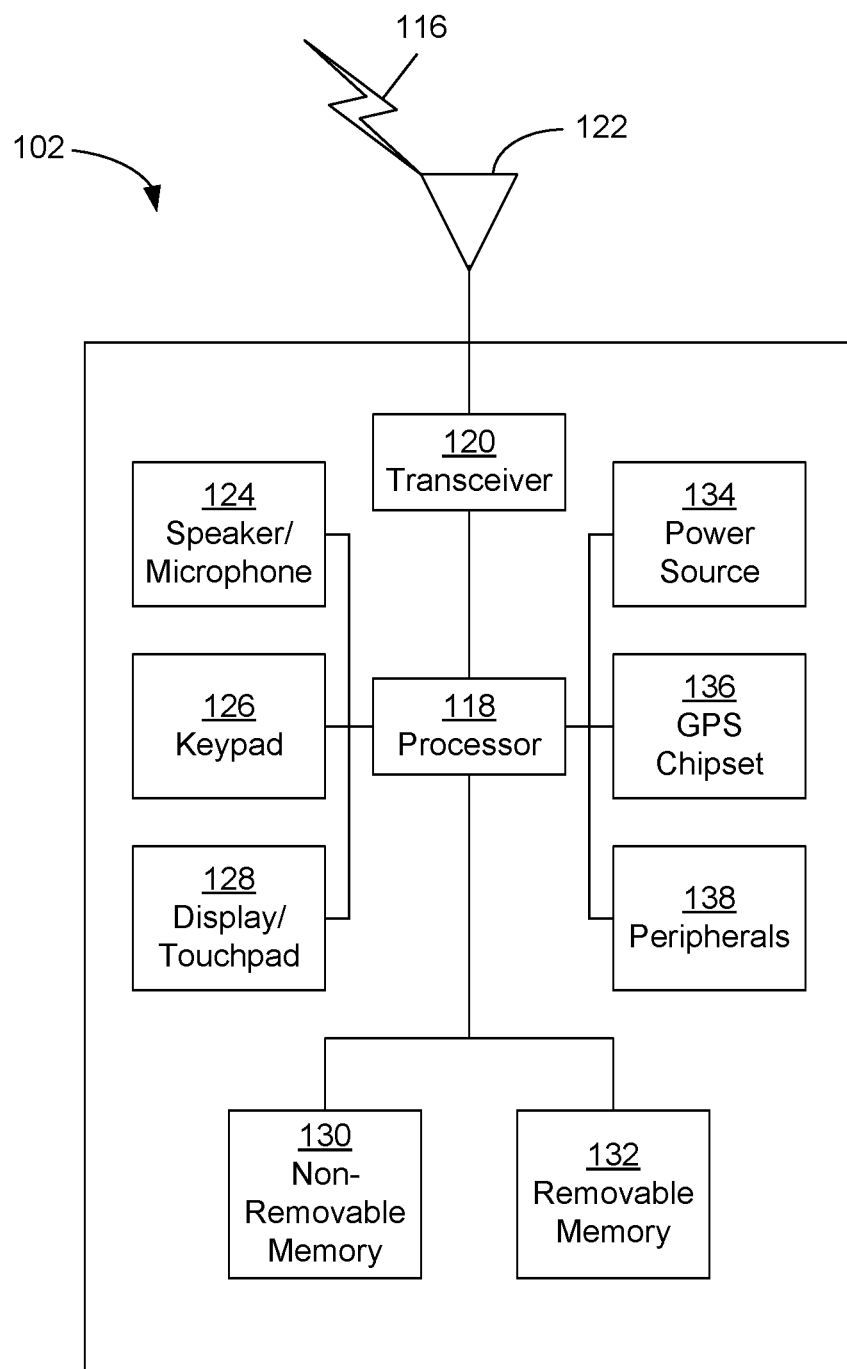
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more thy cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the ON 106 according to an embodiment. As noted above, the RAN 104 may employ an E-UTRA radio technology to communicate with the WTRUs 102a, 102b, 102c over the air interface 116. The RAN 104 may also be in communication with the ON 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 1C:
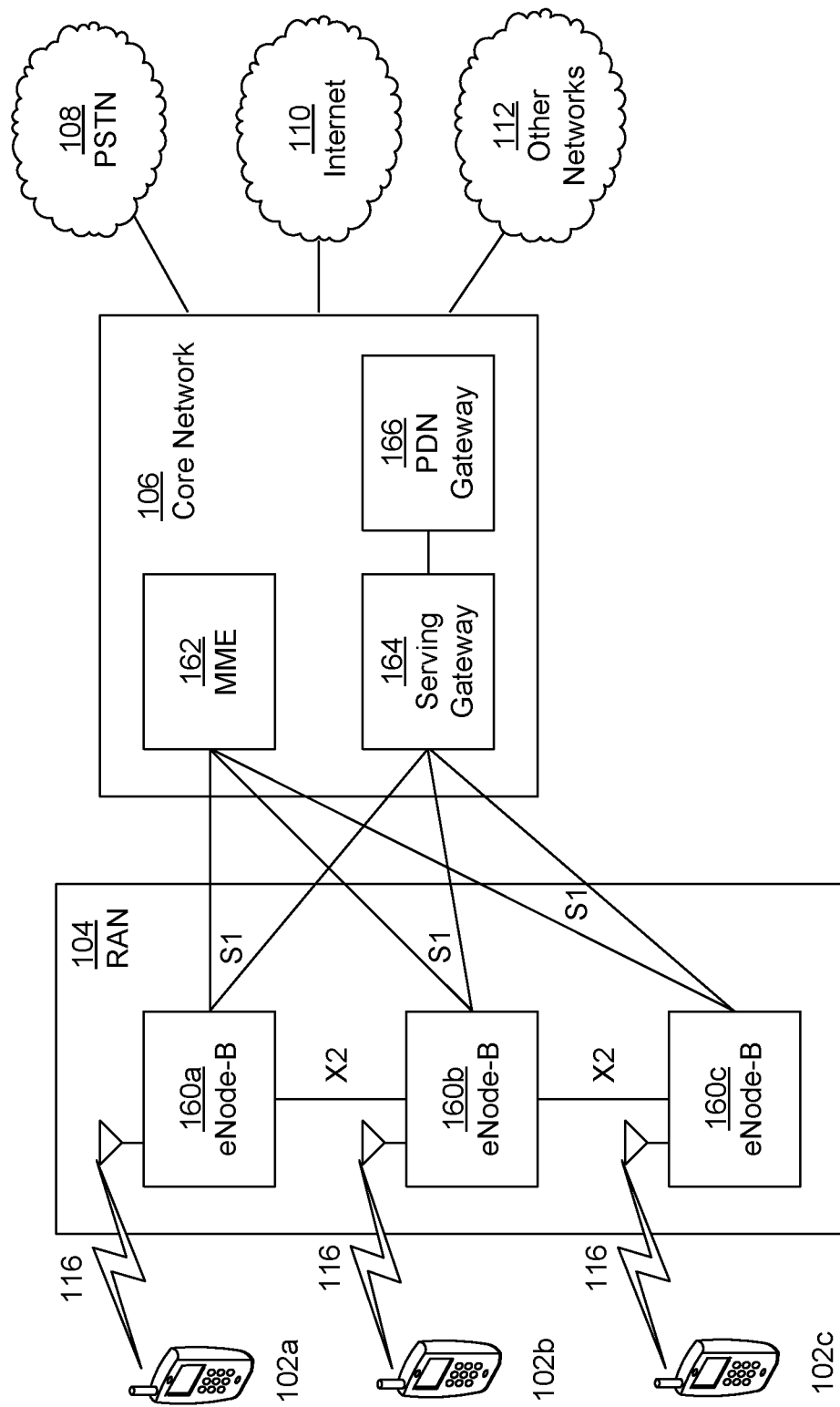
FIG. 1C is a system diagram illustrating an example radio access network (RAN) and an example core network (CN) that may be used within the communications system illustrated in FIG. 1A according to an embodiment.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The ON 106 shown in FIG. 10 may include a mobility management entity (MME) 162, a serving gateway (SGW) 164, and a packet data network (PDN) gateway (or PGW) 166. While each of the foregoing elements are depicted as part of the ON 106, it will be appreciated that any of these elements may be owned and/or operated by an entity other than the ON operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The ON 106 may facilitate communications with other networks. For example, the CN 106 may provide the WTRUs 102a, 102b, 102c with access to circuit-switched networks, such as the PSTN 108, to facilitate communications between the WTRUs 102a. 102b, 102c and traditional land-line communications devices. For example, the ON 106 may include, or may communicate with, an IP gateway (e.g., an IP multimedia subsystem (IMS) server) that serves as an interface between the ON 106 and the PSTN 108. In addition, the ON 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 1D:
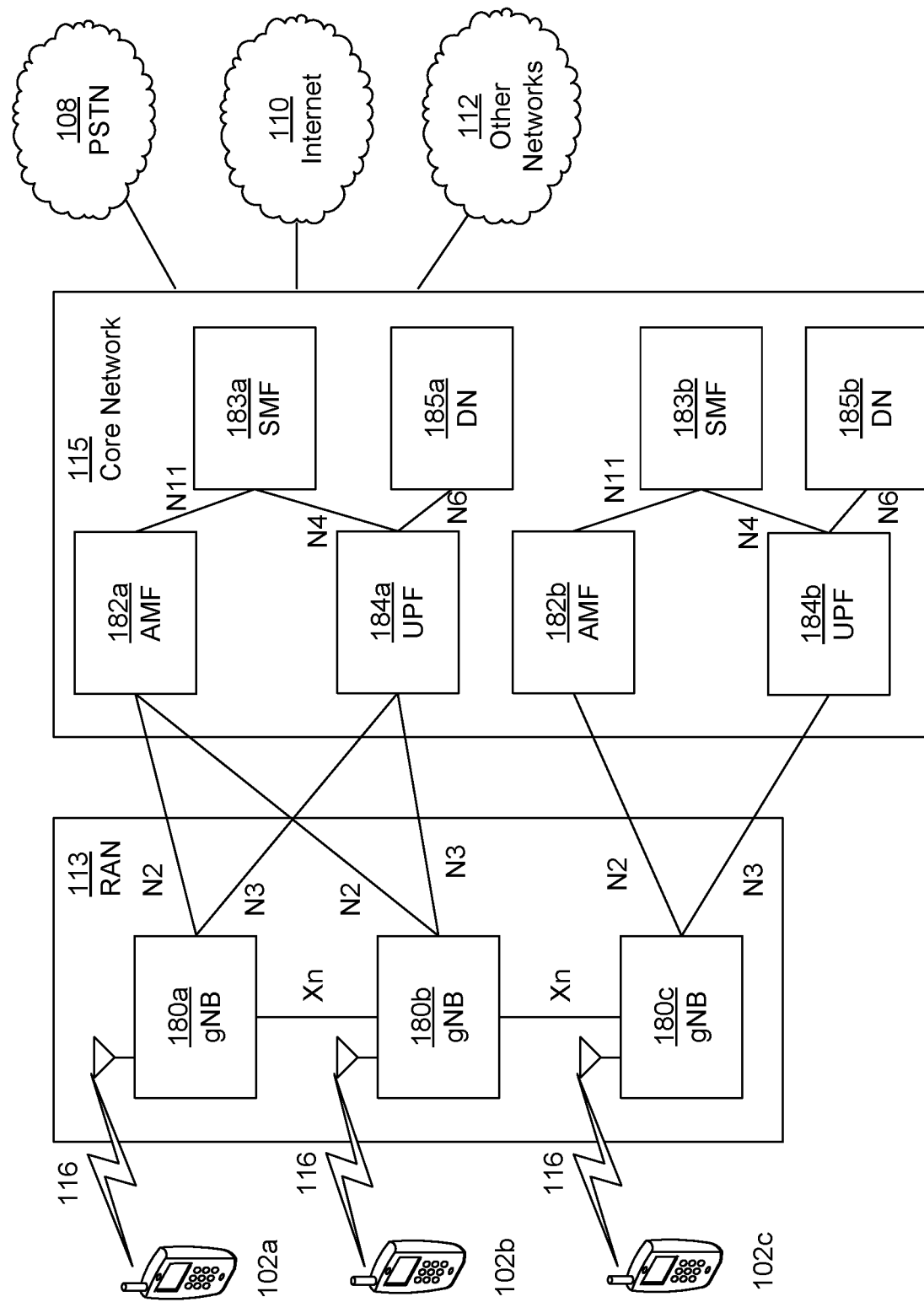
FIG. 1D is a system diagram illustrating a further example RAN and a further example CN that may be used within the communications system illustrated in FIG. 1A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code, FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The ON 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the ON 115, it will be appreciated that any of these elements may be owned and/or operated by an entity other than the ON operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize ON support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the ON 115 via an N11 interface. The SMF 183a, 183b may also be connected to a UPF 184a, 184b in the ON 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The ON 115 may facilitate communications with other networks. For example, the ON 115 may include, or may communicate with, an IP gateway (e.g., an IP multimedia subsystem (IMS) server) that serves as an interface between the ON 115 and the PSTN 108. In addition, the ON 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown) The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-11 described herein may provide some examples, but other examples are contemplated. The discussion of FIGS. 5-11 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
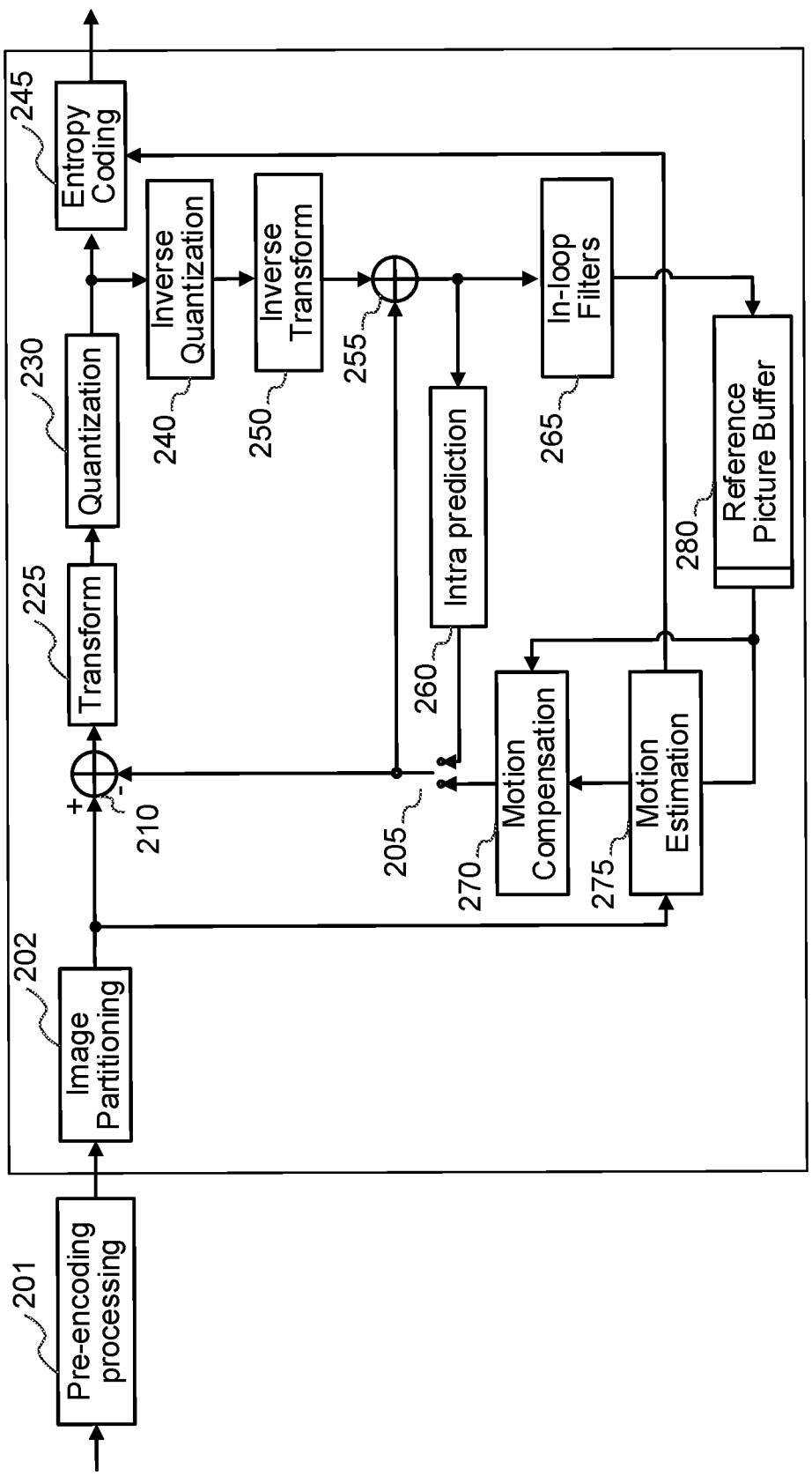
FIG. 2 illustrates an example block-based video encoder.
Figure 3:
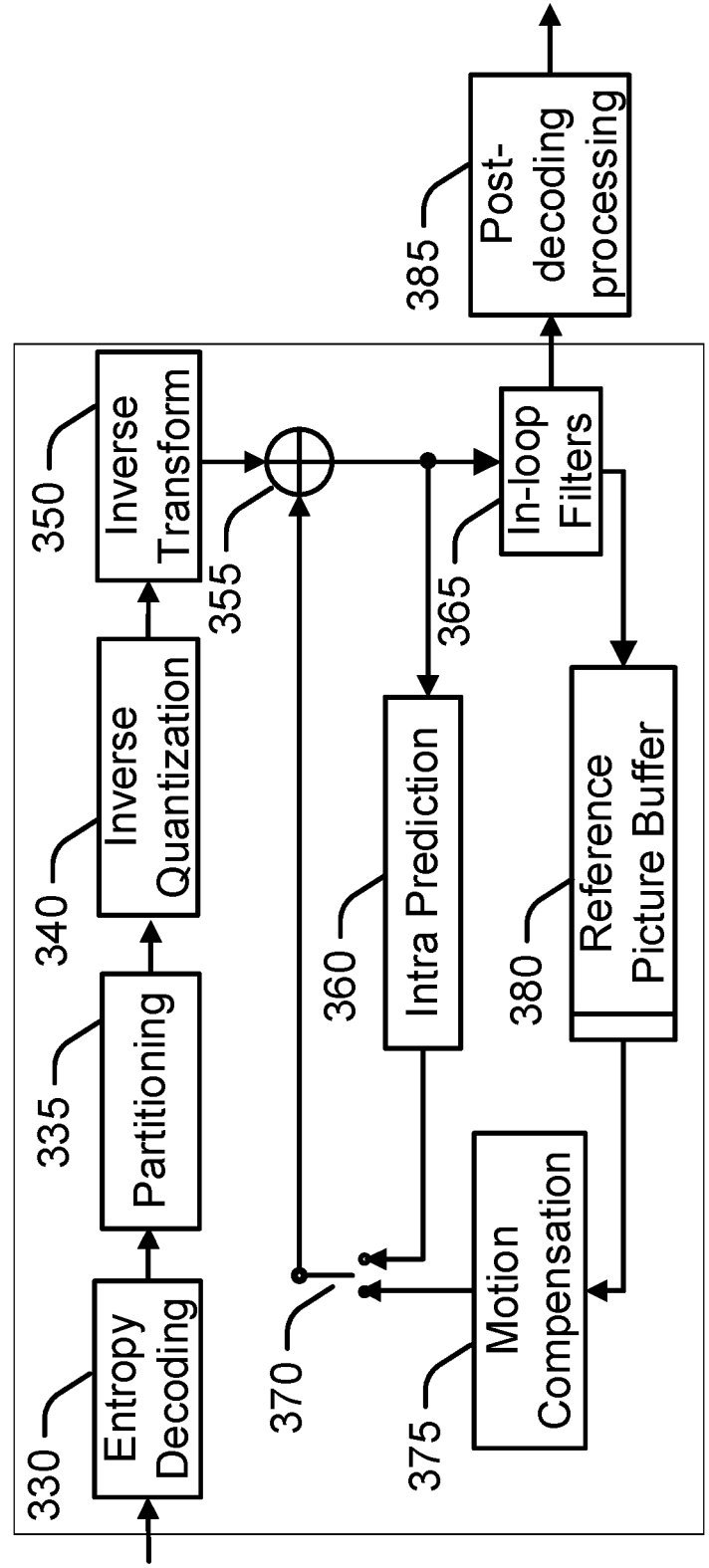
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as numbers of bits, bit depth, etc. These and other specific values are for purposes of describing examples and the aspects described are not limited to these specific values, FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
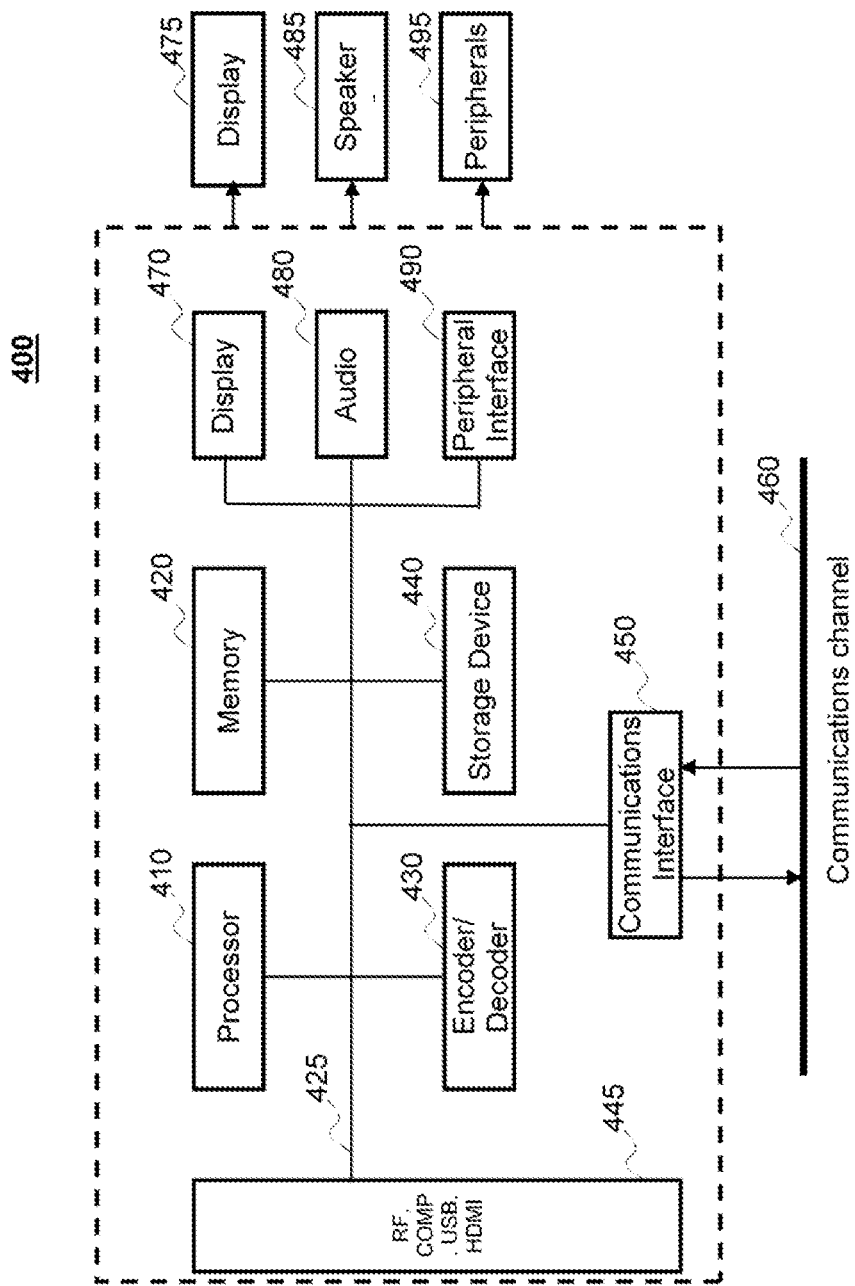
FIG. 4 illustrates an example of a a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, dequantization, inverse transformation, and obtaining precision factors (e.g., precision factors may have one or more precision values to be used in an encoder or decoder operation, or one or more shift values to be used in a quantization or dequantization process), etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, performing quantization, transformation, and obtaining precision factors (e.g., precision factors may have one or more precision values to be used in an encoder or decoder operation, or one or more shift values to be used in a quantization or dequantization process), etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on precision factors, shifts, number of fraction bits etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to decoding. Content adaptive transform may be applied. In particular an apparatus may receive a video bitstream representing content. The video bitstream may comprise quantized transform coefficients for one or more blocks. A precision factor (e.g., shift) may be obtained (e.g., determined or signaled). The precision factor may have one or more precision values to be used in an encoder or decoder operation, or one or more shift values to be used in a quantization or dequantization process. The precision factor may be associated with a block for performing at least one decoding function on the block. In an example, the precision factor may be based on a magnitude of the transform coefficients for the block. The precision factor may reduce the largest magnitude transform coefficient to fit within 16-bits.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an encoding function on an input for a block using a precision factor, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g. using a monitor, screen, or other type of display) a resulting image (e.g., an image from residual reconstruction of the video bitstream). The TV, set-top box, cell phone, tablet, or other electronic device may receive a signal including an encoded image and perform decoding.

Video and/or images may be represented with 8-bit samples. A video (e.g., one coded using motion compensation) may produce a 9-bit residual. Processing via discrete cosine transform (DOT), for example, with a block size of 8×8 or 4×4, may be enabled with a 16-bit integer pipeline at a decoder.

Figure 4A:
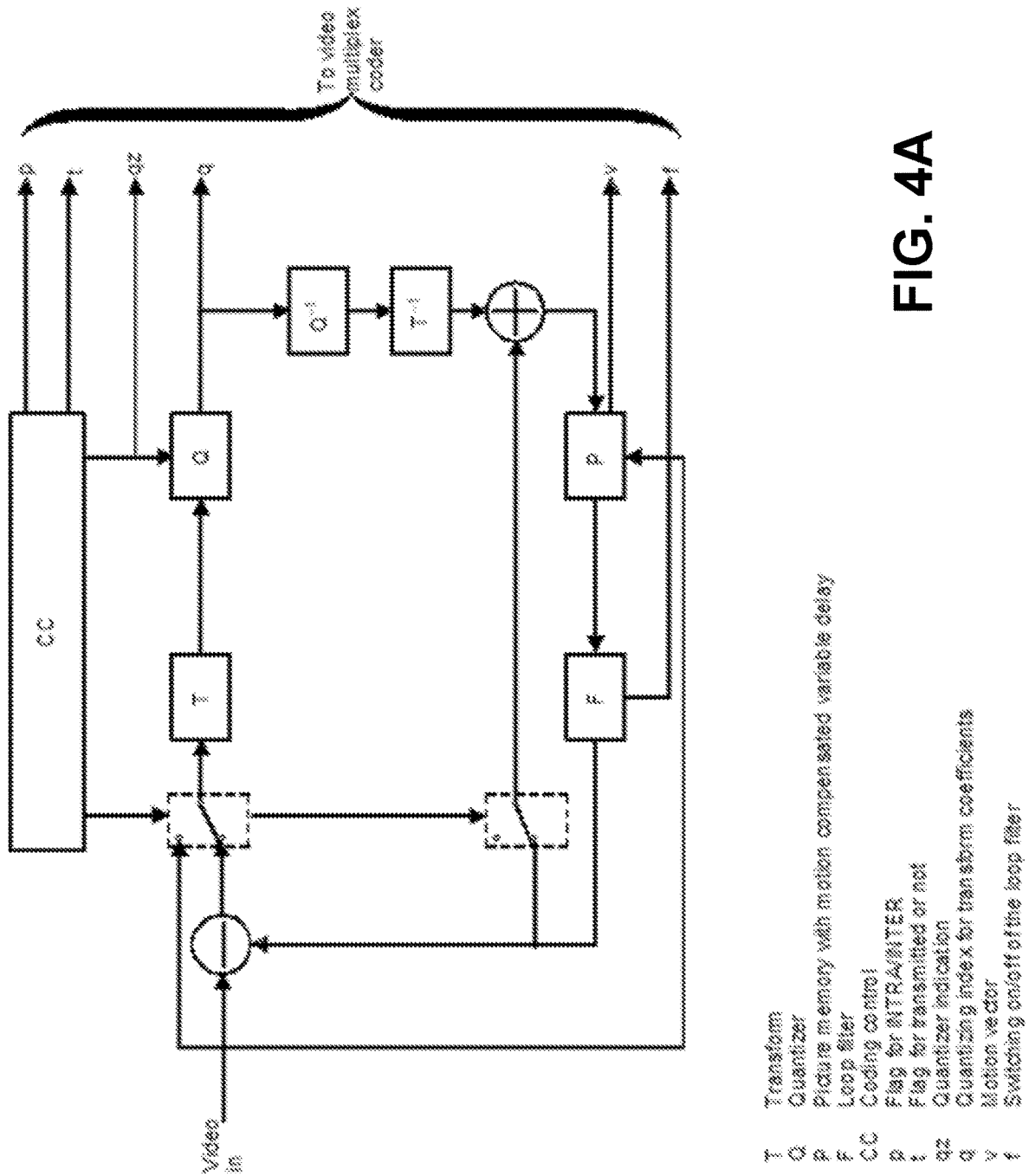
FIG. 4A illustrates an example of a general encoder structure.

FIG. 4A illustrates an example of a general encoder structure.

Video represented with 8-bit samples may exhibit contouring artifacts, for example, in dark regions. A video codec that supports an extended bit-depth in processing may be used. Applications may produce content which requires higher bit-depth samples, such as High Dynamic Range content, synthetic content, and Light Detection and Ranging (LiDAR) range data. Larger block size transforms may be considered in video codecs. Larger block size transforms may increase a residual dynamic range. The video codec may support an extended bit-depth in processing. The pipeline, multiplying and/or memory access may be kept at 16-bit precision.

Dynamic range control may be performed in video coding. Video compression may be operated on 8-bit sample data and/or use 8×8 DOT transformations. Some codec designs may not define a bit-exact inverse transform and/or reconstruction process. Different architectures may be developed for an inverse transform and/or reconstruction. A statistical tolerance, e.g., compared to a reference floating point inverse discrete cosine transform (IDCT), may be used. For example, an inverse transform accuracy specification and/or an inverse discrete cosine transform may be used. Developing different architectures may introduce a drift into a temporal prediction process of a video codec. The drift may be controlled. A frequency at which a block is coded without prediction (e.g., intra) may be specified.

For example, a macroblock may be (e.g., forcibly) updated at least once per every 132 times it is transmitted. An accumulation of inverse transform mismatch error may be controlled. An approach may be used to handle small input signals and/or potential IDCT drift. An IDCT mismatch control may include adding or removing one to a coefficient, for example, if the sum of the coefficients is even after an inverse quantization.

Small non-zero inputs to the IDCT may result in all-zero output for some IDCT approximations. If this occurs in an encoder, a mismatch may occur in decoders that use a different conforming IDCT approximation than the approximation used in modelling the decoding process within the encoder. An encoder may check the output of the encoder's own IDCT approximation. The encoder may avoid inserting non-zero coefficients into a bitstream, for example, when the block in question reconstructs to zero through the encoder's own IDCT function approximation.

Various IDCT drift issues may be analyzed. Some video coding may incorporate coding formats with a bit-depth of above 8 bits. A higher bit-depth may be supported. Additional precision in the video reconstruction pipeline may be used. High bit-depth applications may not be supported by certain general decoders.

A bit-exact reconstruction may be used. A bit-exact inverse transform may be specified. A transform may be used so that the IDCT calculation uses 16-bit multiply operations (e.g. only) and/or 16-bit memory accesses on data produced from a forward transform. In examples, a bitstream may not contain data that result in any reproduced residual value or intermediate coefficient value that exceeds the range of integer values from $-2^{(7+bitDepth)}$ to $2^{(7+bitDepth)}-1$, inclusive.

Clipping operations on coefficients e.g., before the first IDCT and/or between the separable IDCT stages may be (e.g., explicitly) provided, for example, using Eq. 1 and/or Eq. 2.

$$d[x][y]=\text{Clip3}(-32768,32767,((\text{TransCoeffLevel}[xTbY][yTbY][cIdx][x][y]*m[x][y]*\text{levelScale}[qP\%6]<<(qP/6))+(1<<(\text{bdShift}-1)))>>\text{bdShift}) \quad \text{Eq. 1}$$

$$g[x][y]=\text{Clip3}(-32768,32767,(e[x][y]+64)>>7) \quad \text{Eq. 2}$$

Inclusion of a clipping operation may support that a 16-bit dynamic range of the transform is sufficient for IDCT calculation. Normative bit-exact reconstruction formulae may be used (e.g., to avoid drift in the absence of transmission errors).

Dynamic range of transforms may be used. The transform may be an ideal transform. As an example, an N-point transform T with one or more of properties shown in Eq. 3 and Eq. 4 may be used.

T may be an orthogonal transformation. For example, T may preserve $L_2$ energy.

$$\|T \cdot \vec{v}\|_2 = \|\vec{v}\|_2 = \Sigma_{i=1}^{N}(v_i)^2 \quad \text{Eq. 3}$$

T may be a compressive transform. For example, T may take a DC signal to a (e.g., single) coefficient.

$$T \cdot \begin{pmatrix} d \\ d \\ \vdots \\ d \end{pmatrix} = \begin{pmatrix} \alpha \\ 0 \\ \vdots \\ 0 \end{pmatrix} \quad \text{Eq. 4}$$

A set of inputs with limited dynamic range, e.g., $\{\vec{v} \text{ s.t. } |v_i| \le R \; \forall i\}$ may be used.

A maximum magnitude coefficient may be computed, e.g., by applying transform T to the maximum DC signal, for example, as shown in Eq. 5 and/or Eq. 6.

$$\vec{v} = \begin{pmatrix} R \\ R \\ \vdots \\ R \end{pmatrix} \quad \text{Eq. 5}$$

$$T \cdot \begin{pmatrix} R \\ R \\ \vdots \\ R \end{pmatrix} = \begin{pmatrix} \alpha \\ 0 \\ \vdots \\ 0 \end{pmatrix} \quad \text{Eq. 6}$$

A value $\alpha$ may be determined using orthogonality of T, for example, as shown in Eq. 7 and/or Eq. 8.

$$\alpha^2 = \|T \cdot \vec{v}\|_2 = \|\vec{v}\|_2 = \Sigma_{i=1}^{N}(v_i)^2 = N \cdot R^2 \quad \text{Eq. 7}$$

$$\alpha = \sqrt{N} \cdot R \quad \text{Eq. 8}$$

The maximum magnitude coefficient may be increased by a factor of $\sqrt{N}$.

A low magnitude coefficient may be computed, e.g., using one or more of Eq. 9-Eq. 11.

$$\vec{v} = \begin{pmatrix} 1 \\ 1 \\ \vdots \\ 1 \end{pmatrix} = \begin{pmatrix} 1 \\ 0 \\ \vdots \\ 0 \end{pmatrix} + \cdots + \begin{pmatrix} 0 \\ \vdots \\ 0 \\ 1 \end{pmatrix} = \Sigma_{i=1}^{N} \vec{v}_i \quad \text{Eq. 9}$$

$$T \cdot \begin{pmatrix} 1 \\ \vdots \\ 1 \end{pmatrix} = \begin{pmatrix} \alpha \\ 0 \\ \vdots \\ 0 \end{pmatrix} = \Sigma_{i=1}^{N} T \cdot \vec{v}_i \quad \text{Eq. 10}$$

$$\alpha = \sqrt{N} \quad \text{Eq. 11}$$

The DC coefficients of $T \cdot \vec{v}_i$ may sum to $\alpha$. The DC coefficients may be (e.g., may all be) positive. The absolute value of at least one coefficient, c, may be less than or equal to $$\frac{1}{\sqrt{N}},$$

for example, as shown in Eq. 12.

$$0 < |c| \le \frac{\alpha}{N} = \frac{\sqrt{N}}{N} = \frac{1}{\sqrt{N}} \quad \text{Eq. 12}$$

The minimum coefficient may be a fraction of size $$\frac{1}{\sqrt{N}}.$$

Fractional bits may be used to represent values below 1.

Bounds on the maximum and minimum coefficient may be used, for example, as shown in Eq. 13 and/or Eq. 14. A bound on a coefficient dynamic range may be computed, for example, using Eq. 15.

$$C_{max} \ge \sqrt{N} \cdot R \quad \text{Eq. 13}$$

$$C_{min} \le \frac{1}{\sqrt{N}} \quad \text{Eq. 14}$$

$$\text{DynamicRange}(T \cdot v) = \frac{C_{max}}{C_{min}} \ge \frac{\sqrt{N} \cdot R}{\frac{1}{\sqrt{N}}} = N \cdot R \quad \text{Eq. 15}$$

A source limited to $1+\log_2(R)$ bits may be expanded by a maximum of $\log_2(\text{sqrt}(N))$ bits, and/or may require an additional fraction portion of $\log_2(\text{sqrt}(N))$ bits. A total of $1+\log_2(R)+\log_2(\text{sqrt}(N))+\log_2(\text{sqrt}(N))=1+\log_2(R)+\log_2(N)$ bits may be used.

Eq. 16 may be used to determine integer bits for an N-point transform on integer source $\{\vec{v} \text{ s.t. } |v_i| \le R \forall i\}$.

$$\log_2(\text{sqrt}(N))+\log_2(R)+1 \quad \text{Eq. 16}$$

Eq. 17 may be used to determine fraction bits for an N-point transform.

$$\log_2(\text{sqrt}(N)) \quad \text{Eq. 17}$$

A magnitude of a worst-case coefficient (e.g., a maximum magnitude coefficient) may be increased by a factor of sqrt(N) for an N-point 1D transform.

A precision of coefficients may be increased (e.g., more fraction bits may be used), with an increasing transform size.

A number of integer bits used (e.g., needed) may grow with a number of bits used to represent an integer source (e.g., $\log_2(R)$) The number of fraction bits may be independent of a magnitude of the integer source. Results may be summarized for some representative transform sizes.

For example, for a separable 2D transform of size N×M, analysis may be performed (e.g., repeated) using Eq. 18 and/or Eq. 19:

Eq. 18 may be used to determine integer bits for an N×M transform on integer source $\{\vec{v} \text{ s.t.} |v_i| \leq R \ \forall i\}$.

$$\log_2(\text{sqrt}(N)+\text{sqrt}(M))+\log_2(R)+1 \quad \text{Eq. 18}$$

Eq. 19 may be used to determine fraction bits for an N×M transform.

$$\log_2(\text{sqrt}(N)+\text{sqrt}(M)) \quad \text{Eq. 19}$$

TABLES 1 and 2 illustrate that number of integer bits needed may grow with a number of bits used to represent an integer source.

TABLE 1

Transform coefficient bit-depth for 8-bit source

| Rows M | Columns N | Integer Bits | Fraction Bits | Total Bits |
|---|---|---|---|---|
| 4 | 4 | 11 | 2 | 13 |
| 8 | 8 | 12 | 3 | 15 |
| 16 | 16 | 13 | 4 | 17 |
| 32 | 32 | 14 | 5 | 19 |
| 4 | 8 | 12 | 3 | 15 |
| 8 | 16 | 13 | 4 | 17 |

TABLE 2

Transform coefficient bit-depth for 10-bit source

| Rows M | Columns N | Integer Bits | Fraction Bits | Total Bits |
|---|---|---|---|---|
| 4 | 4 | 13 | 2 | 15 |
| 8 | 8 | 14 | 3 | 17 |
| 16 | 16 | 15 | 4 | 19 |
| 32 | 32 | 16 | 5 | 21 |
| 4 | 8 | 14 | 3 | 17 |
| 8 | 16 | 15 | 4 | 19 |

The dynamic range usage of an inverse transform may be analyzed. A signal based on a forward transform may be used. Dynamic range may decrease in an inverse transform of a signal having a forward transform. If quantization alters coefficients, the signal may be expressed as a sum of multiple components (e.g., original coefficients plus a signal based on quantization noise). These components (e.g., original coefficients and/or a signal based on quantization noise) may have different dynamic range behaviors under the inverse transform. The dynamic range of the original signal component may decrease. The inverse transform may increase the dynamic range of the quantization noise. A magnitude of the quantization noise may be dominated by a magnitude of coefficient data. Dynamic range analysis may focus on results of forward transforms. Low precision and/or introduction of clipping may alter the noise, for example, if quantization noise is dominant.

A fixed-point transform may be used. The fixed-point transform may not be precisely orthogonal or fully compacting DC into a single coefficient. From the dynamic range perspective, the fixed-point transform may use additional processing for normalization. The additional processing for normalization may move a sample and/or may not impact a number of bits used to represent a sample. 1-D transform may be analyzed with a possible extension to a separable 2D transform that is produced as 1-D transforms on rows and (e.g., then) on columns. A transform may be based on an integer approximation of the DOT.

A video codec may support 16-bit computation for the inverse discrete cosine transform (IDCT), for example, with a range of block sizes (4, 8, 16, 32) and/or a range of sample bit-depths (8, 10, 12, 14, 16). Clipping of high magnitude residual signals may be avoided. Precision for low-amplitude residual signal may be preserved. For a given coding unit (CU), clipping of high magnitude coefficients may be avoided (e.g., in preference to preserving precision). Low-amplitude residual signals may be preserved, for example, when high magnitude coefficients are not present.

Figure 5:
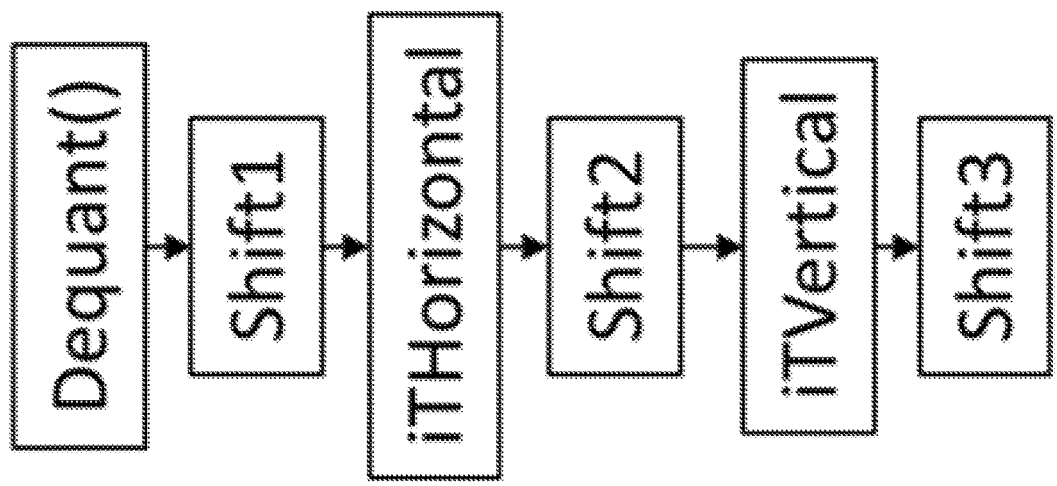
FIG. 5 illustrates an example of a dequantization and/or inverse transform.

Dynamic range limits may impact the maximum coefficients processed. Dynamic range limits may impact the precision of low-amplitude coefficients. FIG. 5 illustrates an example of a dequantization and/or inverse transform. The example (500) illustrated in FIG. 5 may be implemented. For example, an encoded video bitstream representing content may be received. Dequantization may be performed. A shift (e.g., Shift 1) may be used for the inverse transform dynamic range (see Table 3). The shift may be based (e.g., set) on bit-depth and/or block size. The shift may be independent of a source bit depth and dynamic range.

A code for the inverse transform (e.g., in void TrQuant: xIT( )) may use a shift after a horizontal stage (e.g., Shift 2) and/or a shift after a vertical transform stage (e.g., Shift 3). A size of a second shift may depend on a bit depth. In an example, the size of the second shift may not depend on a transform size or signal statistics.

A scaling may be used in dequantization, for example, prior to inverse transforms. The scaling used in dequantization prior to the inverse transforms may account for transform normalization scaling and/or block size effects. The scaling used in dequantization may not account for specific characteristics of a signal, for example, a scaling used in dequantization may be set for a worst-case possible signal. An operation of dequantization and inverse transform(s) may include one or more shifts (e.g., three shifts shown in FIG. 5). This may be shown in Table 3.

TABLE 3

| | |
|---|---|
| A first shift (e.g., shift 1 as shown in FIG. 5) | may depend on one or more of bit-depth, block size, and/or bits used for inverse transform dynamic range. |
| A second shift (e.g., shift 2 as shown in FIG. 5) | may depend on a number of bits used for matrix calculation (e.g., 6) and/or a transform size. In some models, the transform size may be factored into a forward transform and/or may not be used. |
| A third shift (e.g., shift 3 as shown in FIG. 5) | may depend on one or more of a bit-depth, bits used for inverse transform dynamic range, and/or bits used for matrix calculation |

Values of shifts (e.g., the first to the third shifts) may be determined, for example, if or when a worst-case input is assumed. The determined values of shifts may avoid clipping, for example, at the upper end. In some examples, the values of shifts may not depend upon a content of a signal. In an example, the three shifts in FIG. 5 may be considered base shifts (e.g., shift 1 may be a base_dequant_shift; shift 2 may be a base_mid_transform_shift; shift 3 may be a base_normalization_shift). In some examples, base shift values depend upon source bit-depth and/or transform block size, however, the base shift values do not depend on the actual source content.

Figure 6:
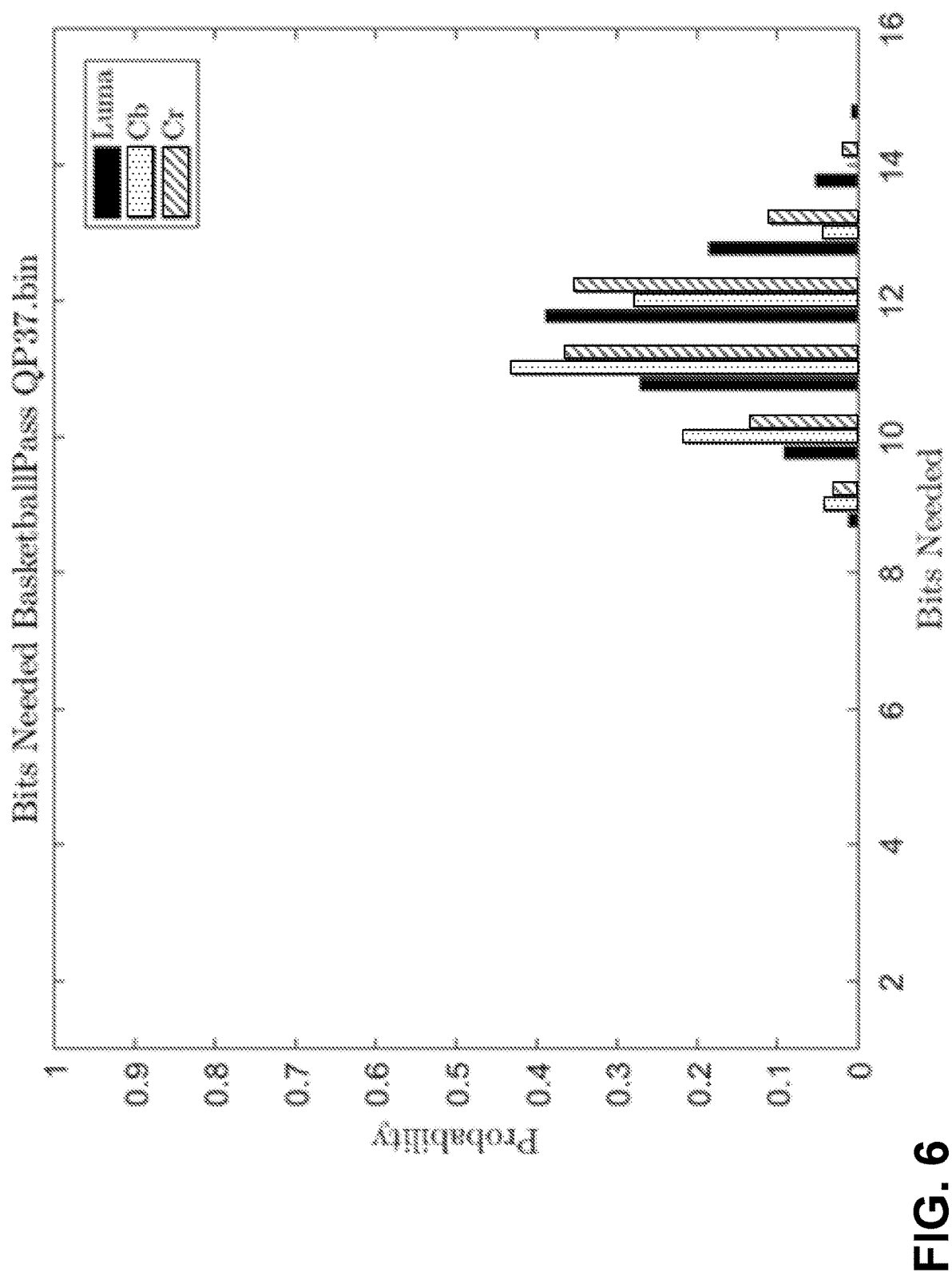
FIG. 6 illustrates an example of bits to be used (e.g., prior to inverse transform for sample sequence (e.g., intra only)).

Some sample data may be collected based on the number of bits needed in a transform unit (TU) e.g., for some sample encodings, FIG. 6 illustrates an example of bits to be used (e.g., prior to inverse transform for sample sequence (e.g., intra only)). The example in FIG. 6 may show sample data collected based on the number of bits needed in each TU for some sample encodings. Data may be determined by recording values of coefficients in a TU {v}. The example in FIG. 6 may show the maximum absolute value of coefficients in a TU {v}. For example, the number of bits needed for a value v may be determined (e.g., defined) in Eq. 20. FIG. 6 may show the probability of the number of bits needed. In FIG. 6, probabilities are shown per color component for TU blocks, for example, TU blocks of an intra coded test sequence. As shown in FIG. 6, 16-bits are not needed for typical content. 16-bits may be used for the worst-case results. Bits less than 16-bits (e.g., 12-bits or fewer) may be used for data other than worst case results.

$$\text{BitsNeeded}=1+\text{ceil}(\log_2(|v|)) \quad \text{Eq. 20}$$

A precision of an inverse transform during a residual operation may be determined, for example, based on 16-bit constraint. A 16-bit constraint may reduce precision in cases where it is not necessary. A bit-depth of content which can be processed without loss of precision on low amplitude signals (e.g., 10-bit depth data and/or a 4×4 transform may use 15 bits of precision as seen in TABLE 2) may be determined, e.g., based on a 16-bit constraint. Certain codecs operating with a default configuration may support representing data internally, for example, with at most 10 bits. A high bit-depth input may be scaled to 10-bits, for example, prior to encoding. QP value may be adjusted, for example, based on an input bit-depth. A decoder may be informed of the input bit-depth and/or may adjust QP. Certain codecs may operate at InternalBitDepth=10, for example, regardless of source bit-depth level setting for this value.

Data that satisfies a 16-bit constraint on an inverse transform calculation (e.g., 8-bit or 10-bit video) may be compressed, e.g., as described herein. Precision may increase and/or provide compression improvements. Data that uses more than 16-bits in an inverse transform (e.g., 12-bit or 14-bit video) may be compressed with a 16-bit constraint on the inverse transform calculation. Processing may be adapted to the content of a block, a TU, a CU, a CTU or the like. A high precision may be achieved while avoiding overflow.

A multiplier and/or storage resources may be used flexibly (e.g., by accounting for the content of a signal). For example, a 16-bit multiplier and/or storage resources may, for example, be used flexibly at a decoder. Clipping of high magnitude residual coefficient signals may be avoided. Precision of low-amplitude residual coefficient signals may be preserved, for example, when not simultaneously present with high magnitude residual coefficients. A shift(s) may be used to adjust data, for example, the data processed by the IDCT. The adjustment may be based on, for example, a factor other than a source bit-depth and/or a transform block size. Overflow in a 16-bit IDCT calculation may be avoided.

In examples, a video bitstream representing content may be received. The video bitstream may comprise quantized transform coefficients for a plurality of blocks. A precision factor (e.g., shift) may be associated with a block for performing at least one decoding function on the block. Examples of decoding functions include dequantization and/or inverse transform. The precision factor may be adapted based on the content of the video bitstream. The precision factor may be based on a magnitude (e.g., on a largest magnitude) of the transform coefficients for the block (e.g., a magnitude input may be based on the largest magnitude of the residual coefficients associated with the block). The decoding function may be performed on the quantized transform coefficients for the block using the precision factor.

A shift (e.g., precision factor; e.g., a value of the shift) may be determined, for example, based on a magnitude (e.g. the maximum (e.g., largest) absolute value) of residual coefficients of a current block (e.g., a transform block being decoded). For example, the magnitude of the residual coefficients of a current block may be a fraction of the maximum possible residual signal (e.g., based on worst case analysis). A value of the shift (e.g., of coefficient data) may be selected prior to the IDCT. The shift used in a construction of residual data may modified, for example, in combination with selecting the shift of coefficient data. The modification may be for consistency. Precision factors (e.g., shifts) may be determined based on a determined magnitude input (e.g., a largest magnitude input) based the content.

Figures 7, 8:
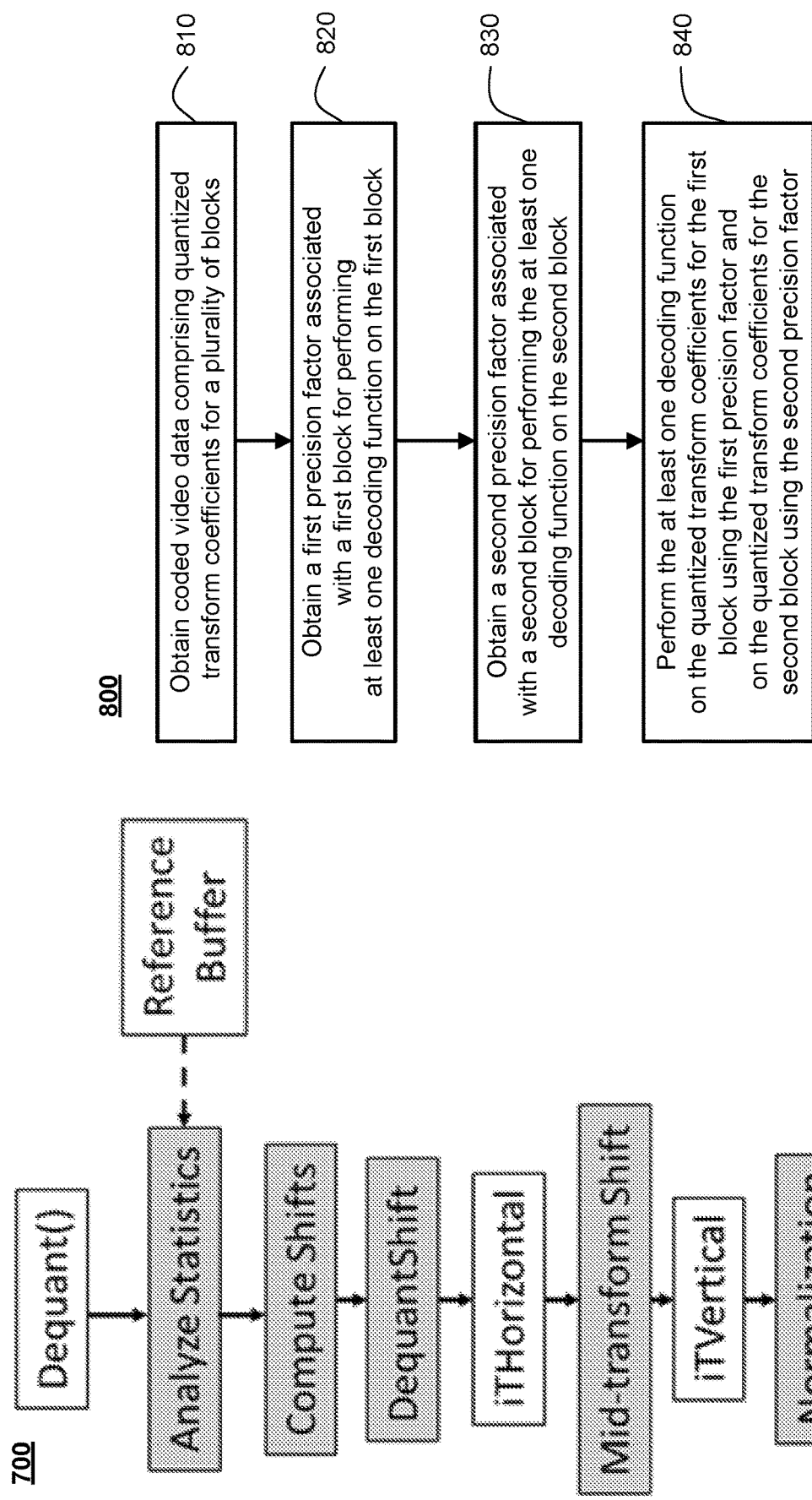
FIG. 7 illustrates an example of dequantization and/or inverse transform.
FIG. 8 illustrates an example of a flow chart of a decoding operation according to the present disclosure.

Shifts used, for example, in combination with dequantization and inverse transform stages illustrated in FIG. 5, may be obtained. The shifts may be obtained to account for content of a signal. The shifts may be obtained to produce a signal adaptive behavior. The utilization of a finite width register may be improved, for example, at a decoder. An example result (e.g., of the modification) is illustrated in FIG. 7. FIG. 7 illustrates an example of dequantization and/or inverse transform. An example module (700) may be used to compute statistics of a signal (e.g., the maximum absolute values of a TU or other). As shown in FIG. 7, module "Compute Shifts" may be used to compute shifts, for example, based on an analysis of the signal (e.g., a content-based analysis of the source signal). A dequant shift may be provided. A mid-transform shift may be provided. A normalization shift may be provided. The shift(s) before the first inverse transform and/or after the last inverse transform may be obtained based on the computed maximum value, for example, subject to the constraint of Eq. 21. Eq. 21 may be used to determine a relation of shifts.

$$\text{Shift}_{Dequant}+\text{Shift}_{Mid}+\text{Shift}_{Normalization}=\text{Shift}_1+\text{Shift}_2+\text{Shift}_3 \quad \text{Eq. 21}$$

The sums of the left side and right side may be the same (e.g., to have the same normalization). In an example, the shifts on the right side of Eq. 21 may depend upon source bit-depth and/or transform block size (e.g., values do not depend on the actual source content). Additionally, the shifts on the right side of Eq. 21 may be based on theoretical maximums, which, if not needed (see FIG. 6), may result in a loss of efficiency and/or precision. In contrast, the shifts on the left side of Eq. 21 may be based on actual source content (e.g., by determining a largest magnitude for a set of dequantized data and/or determining a bound of the coefficients to limit the maximum of a transform result). Accordingly, the shifts on the left side of Eq. 21 may provide increased precision and/or increased dynamic range while using the same hardware (e.g., decoder and/or encoder) as the shifts on the right side of Eq. 21.

Inverse transforms (e.g., 16-bit inverse transform(s)) may be used. A signal may or may not attain the theoretical maximums allowed. When the theoretical maximum is not achieved, precision may be increased. Higher bit-depth source may be supported where precision may be achieved by adaptation. Higher precision processing may not be required.

The size of shifts may be reduced. For example, the size(s) of left shifts may be reduced at dequantization and/or inverse transform operations (e.g., early stages of the dequantization and/or inverse transform operations). Precision may be increased. Shifts (e.g., the example shifts herein) may be constrained, e.g., to have the same sum as the sum of shifts in certain video coding. Normalization may be maintained through the processing pipeline. Examples herein may be used for determining the first and second shifts (e.g., $Shift_{Dequant}$ and $Shift_{Mid}$). The second shift (e.g., $Shift_{Mid}$) may be obtained, for example, based on a change introduced and/or an inverse transform gain. The final shift value $Shift_{Normalization}$ may be obtained, for example, according to Eq. 22. The final shift value $Shift_{Normalization}$ may be obtained to preserve consistent normalization. Eq. 22 may be used to determine a constraint on sum of shifts.

$$(Shift_{Dequant} + Shift_{Mid} + Shift_{Normalization}) = (Shift1 + Shift2 + Shift3) \quad \text{Eq. 22}$$

A dequantization shift may be selected. A selection of shift may be based upon a coefficient value (e.g., the maximum coefficient value of a TU). Coefficient data may be analyzed to determine a shift, for example, the minimum shift used to reduce the largest magnitude coefficient to an input dynamic range of an inverse transform processing (e.g., of 16-bits). A residual reconstruction process for a CU may be performed, e.g., to compute the maximum absolute magnitude M of a transform coefficient in a transform block. From this, a shift $Shift_{Dequant}$ may be determined, for example, based on Eq. 23. The shift $Shift_{Dequant}$ may be determined so that $C_{i,j} \gg Shift_{Dequant}$ (e.g., in Eq. 23) may be contained in 16-bits, for example, for every coefficient $C_{i,j}$. A right shift may be performed. If the value of M is below 16-bits, a left shift may be performed. A right shift may be combined with the addition of a rounding offset, for example, prior to the shift.

Eq. 23 may be used to determine a dequantization shift.

$$Shift_{Dequant} = ceil(\log_2(M)) - 16 \quad \text{Eq. 23}$$

Analysis of the set of coefficients may be selected for scaling of coefficients. For example, the maximum coefficient for scaling of coefficients (e.g., prior to the IDCT) may be selected in several ways. In examples, dequantization to 32-bits may be performed, and/or a recording of the maximum coefficient may be followed by a renormalizing shift (e.g., applied to all coefficients). In examples, a (e.g., each) coefficient may be dequantized into 16-bits of precision, and/or an appropriate scaling may be recorded. The coefficient(s) may be rescaled appropriately (e.g., subsequently). In these examples, a memory used may be minimal. In examples, two passes may be used. In a first pass, non-zero coefficient levels and/or QP values may be read, for example, to determine a number of fraction bits used for coefficients (e.g., a shift value). Non-zero coefficient levels and/or QP values may vary based on spatial location. In a second pass, coefficients may be dequantized with the appropriate number of fraction bits, for example, based on the selection. The maximum coefficient and/or dequantization or rescaling process may be determined using parallelism, for example, on each subtask. Coefficients may be scaled independently from each other (e.g., in parallel), for example, once the shift is determined. In examples, coefficients are independent in the scaling process except when coefficients are used for the determination of a shift.

The shifts may be determined, for example, based on transform coefficients in the video bitstream. Such determination may be made by a video decoder, for example. The number of fraction bits to use may be signaled or inferred from signal contents. A fixed scaling may be used. The fixed scaling may be determined based on signaled parameters (e.g., bit-depth and transform size).

In examples, a signal analysis process may be performed to select the dequantization shift. In examples, the maximum coefficient value (e.g. a maximum absolute value of the coefficients) of the TU may be selected. Content adaptive maximum may be conservative in determining an overflow. More detailed statistics (e.g., the L1 norm of the rows/columns) may be used.

The decoder may select between a set of shifts and/or precision values. The decoder may use the dynamic range of dequantized coefficient values, for example, to select between a set of shifts and/or precision values.

A shift (e.g., catp_dequant_shift) may be computed based on (e.g., based solely on) the maximum coefficient value prior to dequantization. A shift immediately following dequantization of a block of coefficients may be obtained based on the content (e.g., as opposed to a worst-case possible signal). Subsequent shift(s) (e.g., inverse transform or normalization) may not reflect additional content adaptivity (e.g., other than resulting from the dequantization shift). In examples, a block of coefficient data may be dequantized to 32-bits to give Cij. A largest magnitude dequantized data (e.g., M=max(|Cij|)) may be determined. A number of bits need to represent M (e.g., nBits=ceil($\log_2(M)$))) may be determined. A shift needed to reduce the maximum to fit within 16-bits (e.g., catp_dequant_shift=nBits−16 (if negative may use zero instead)) may be determined.

A mid-transform shift may be selected. In examples, a mid-transform shift (e.g., catp_mid_transform_shift) may be selected to compensate for the dequantization shift (e.g., Eq. 24).

Eq. 24 may be used for determining a mid-transform shift.

$$Shift_{Mid} = Shift_2 + (Shift_1 - Shift_{Dequant}) \quad \text{Eq. 24}$$

A precision in applying a transform (e.g., the first transform) may be increased, for example, if Eq. 24 is used.

In examples, a mid-transform shift may be selected based on content. The mid-transform shift (e.g., selected) may allow additional precision to be preserved through the second transform. In these examples, analysis may be performed on dequantized data, and/or a magnitude following the first transform may be determined from transform bounds (e.g., as described herein).

Bounds may be used. For example, bounds on the absolute magnitude of an output of a transform (e.g., defined by a left multiplication by a matrix T) may be presented. Multiple types (e.g., two types as shown in Eq. 25 and Eq. 26) of bounds may be used in different applications. The types of bounds used may limit a magnitude of the result of a transform calculation (e.g., based on a transform matrix and/or an analysis of an input).

Eq. 25 may be used for determining dynamic range bound I. The catp_mid_transform_shift may be determined based on sum of matrix transform coefficients and maximum coefficient data.

$$|T \cdot C|_{r,c} = |\Sigma_k T_{r,k} * C_{k,c}| \le (\Sigma_k |T_{r,k}|) * (\max_{k,c} |C_{k,c}|) \quad \text{Eq. 25}$$

In examples, for each row, the sum of absolute values of transform coefficients $M_r = \Sigma_k |T_{r,k}|$ may be determined. A maximum of rows $M = \max_r M_r$ may be determined (e.g., this may be done offline as the transform T is known). A maximum coefficient in the current block $C_{max}=\max_{r,c}|C_{r,c}|$ may be determined. A number of bits needed for the product $M \cdot C_{max}$ may be a sum number of bits for each component and/or directly computed: nBits=ceil($\log_2(M \cdot C_{max})$), and the catp_mid_transform_shift=nBits−16 may be determined.

A first bound (e.g., dynamic range bound I determined based on Eq. 25) may use the maximum absolute coefficient values, for example, only the maximum absolute coefficient values. If data is limited to 16-bits, the first bound may be used without an analysis, and/or a transform analysis may be performed offline. If data is a result of a forward transform (e.g., as with an inverse transform calculation), the first bound may not be used.

Eq. 26 may be used for determining dynamic range bound II. The catp_mid_transform_shift may be determined based on the maximum transform coefficient and column sum of coefficient data.

$$|T \cdot C|_{r,c}=|\Sigma_k T_{r,k}*C_{k,c}|\leq(\max_{r,c}|T_{r,c}|)*(\Sigma_k|C_{k,c}|) \qquad \text{Eq. 26}$$

In examples, a maximum absolute coefficient $M=\max_{r,c}|T_{r,c}|$ may be determined and a number of bits needed to represent M i.e. MatrixBitsUsed=ceil($\log_2(M)$) may be determined. The number of bits may be determined offline (e.g., the number of bits may be independent of content (e.g., although the number of bits will differ based on transform signaled)). For each column c of coefficients a sum of the absolute values $M_c=\Sigma_k|C_{k,c}|$ may be determined. A maximum sum of columns $M=\max_c M_c$ may be determined. A number of bits needed to represent the maximum sum of absolute column coefficients CoefficientBitsUsed=ceil($\log_2(M)$) may be determined. TotalBitsUsed may be MatrixBitsUsed+CoefficientBitsUsed−1 (where 1 is subtracted to avoid double counting a sign). A catp_mid_transform_shift=TotalBitsUsed−16 may be determined. If the result is negative, it may be replaced with zero. A content based bound may be developed, for example, based on Eq. 26. Analysis of a coefficient data input to a first inverse transform may be used to determine a bound on an output of the first inverse transform output based on a second bound (e.g., as described herein).

For example, the bound in Eq. 26 may be used to determine a bound on a dynamic range of data, for example, following a first transform, from an analysis of a coefficient data input to the first transform. The shift applied following the first inverse transform may be computed based on the analysis of data before the transform.

In another example of using the bound of Equation 26, a number of bits used for the product is computed directly. This may result in a smaller shift, for example, if the bits needed to represent the signed values −5 and −9 are 4-bits (e.g., 3 bits for magnitude and 1 bit for sign) and 5-bits (e.g., 4 bits for magnitude and 1 bit for sign) respectively (e.g., 4+5−1=8 signed bits), while the value of +45 needs only 7 signed bits (e.g., 6 bits for magnitude and 1 bit for sign), the result is a shift one bit lower for catp_mid_transform_shift.

Equation 25 and Equation 26 may be combined (e.g., to calculate shifts on a per transform unit). In an example, catp_dequant_shift and catp_mid_transform shifts may be determined individually per column.

Eq. 27 may be used to determine coefficient bound statistic.

$$B=\max_c|\Sigma_k|C_{k,c}|| \qquad \text{Eq. 27}$$

In examples, the bound in Eq. 27 may depend on an analysis of coefficient data, and/or a result may be used to limit the maximum of a transform result (e.g., as shown in Eq. 28).

Eq. 28 may be used to determine a coefficient bound.

$$\forall_{r,c}|T \cdot C|_{r,c} \leq (\max_{r,c}|T_{r,c}|)*B \qquad \text{Eq. 28}$$

Values of a coefficient matrix may be bounded (e.g., $|T_{r,c}|\leq 2^7$). A fixed shift may be used for Shift 2 (e.g., Shift 2=7) based on the bound. Mid-transform shift may be determined using Eq. 29. Intermediate values may be reduced to 16-bits.

In examples, Eq. 29 may be used to determine a mid-transform shift.

$$\text{Shift}_{Mid}=\text{ceil}(\log_2(B))-16+\text{Shift2} \qquad \text{Eq. 29}$$

In examples, a mid-transform shift may be determined by analyzing a magnitude(s) of results following a first transform. In the examples, Eq. 30 and/or Eq. 31 may be used to determine the mid-transform shift, K may be the maximum absolute value of the output of the first transform. In the examples, precision may increase for the second transform. An analysis of data may be performed following the first transform. The output of the first transform may be saved at high bit-depth, for example, prior to the mid-transform shift being determined. An additional computation aspect may be used. High bit-depth results may be stored, for example, following the first transform. A temporary buffer may be used. Additional memory to store the output of the first transform at high bit-depth may be used.

Eq. 30 and/or Eq. 31 may be used to determine a mid-transform shift.

$$K=\max(|T(C_{i,j}>>\text{Shift}_{Dequant})|) \qquad \text{Eq. 30}$$

$$\text{Shift}_{mid}=\text{ceil}(\log_2(K))-16 \qquad \text{Eq. 31}$$

A normalization shift may be determined.

In some examples, if (e.g., once) two of the shifts are selected (e.g., $\text{Shift}_{Dequant}$ and $\text{Shift}_{Mid}$), the third shift $\text{Shift}_{Normalization}$ may be determined, for example, using Eq. 22. Eq. 22 may be solved to determine the normalization shift based a constraint and selected shifts (e.g., $\text{Shift}_{Dequant}$ and/or $\text{Shift}_{Mid}$). A result of solving Eq. 22 may be shown in Eq. 32.

Eq. 32 may be used to determine a normalization shift.

$$\text{Shift}_{Normalization}=\text{Shift}_3-(\text{Shift}_{Dequant}-\text{Shift}_1)-(\text{Shift}_{Mid}-\text{Shift}_2 2) \qquad \text{Eq. 32}$$

In examples, shifts may be computed from more detailed analysis of statistics of a TU and/or reference data.

A video bitstream representing content may be received, the video bitstream comprising quantized transform coefficients for one or more blocks. A precision factor (e.g., shift) based on a magnitude of the transform coefficients for a block may be determined. The precision factor may reduce the largest magnitude transform coefficient to fit within 16-bits. The precision factor may reduce the largest magnitude transform coefficient to an input dynamic range of inverse transform processing. The precision factor may be used for performing at least one decoding function. The decoding function may be dequantization and/or inverse transform processing. The decoding function may be used in residual reconstruction of the video bitstream. A number of bits may be determined to represent the largest magnitude of the transform coefficients. Signaling may be received indicating a number of fraction bits to use in determining the precision factor. A second precision factor may be determined. The first precision factor and/or the second precision factor may be a content-dependent value. The second precision factor may be applied during inverse transform processing. The second precision factor may limit the magnitude of the result of a transform based on a maximum absolute value of the output of a dequantizing transform. The second precision factor may comprise a column sum of transform coefficients. Bounds on the absolute magnitude of an output of a transform may be determined. A third precision factor may be determined. The third precision factor may be applied during normalization processing. The sum of the three precision factors may be a content-independent value.

FIG. 8 illustrates an example of a flow chart of a decoding operation (800) according to the present disclosure that may be employed in systems, methods, and instrumentalities. Coded video data comprising quantized transform coefficients for a plurality of blocks may be obtained (810). A first precision factor associated with a first block for performing at least one decoding function on the first block may be obtained (820). A second precision factor associated with a second block for performing the at least one decoding function on the second block may be obtained (830). The at least one decoding function may be performed on the quantized transform coefficients for the first block using the first precision factor and on the quantized transform coefficients for the second block using the second precision factor (840). The first precision factor may be signaled. The first precision factor may be determined based on a magnitude of the transform coefficients for the first block.

An encoder may be used in relation to one or more of the examples herein.

A decoder (e.g., as described herein) may be enabled as isolated from or embedded in an encoder. Additional precision may be achieved in an inverse transform calculation. Measures may be taken to reduce an impact of quantization noise by an encoding process, for example, if an encoder is aware of a high precision capability of an inverse transform. Quantization noise may be generated by an encoding process, e.g., during an encoder operation. Quantization noise effects may be hidden by a limited precision, for example, if an inverse transform has the limited precision.

Figure 9:
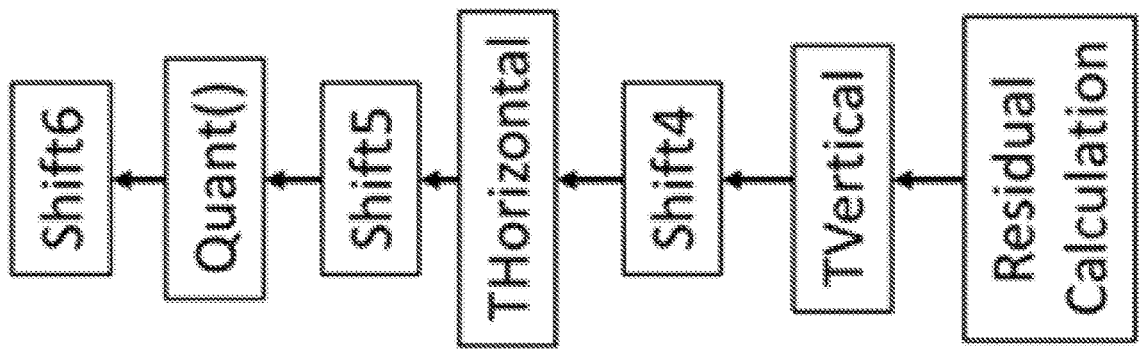
FIG. 9 illustrates an example of shifts in a forward transform.

A context adaptive technique may be used, for example, if residual data (e.g., prediction residual data) is not the worst case. The precision used by one or more forward transforms may be improved. FIG. 9 illustrates an example of shifts in a forward transform (900). A structure of the forward transform of a residual signal may be used (e.g., as shown in FIG. 9). Residual data (e.g., worst-case residual data) is calculated. Vertical transformation of the data may be performed. A shift (e.g., precision factor; Shift 4) may be applied to the transformed data. A horizontal transform of the data may be performed. A shift (e.g., precision factor; Shift 5) may be applied to the transformed data. A quantization of the data may be performed. A shift (e.g., precision factor; Shift 6) may be applied to the quantized data. Overflow (e.g., in the event of worst-case residual data) may be avoided.

FIG. 10 illustrates an example of a CATP forward encoder (1000). Analysis of residual components may be performed to determine a magnitude(s) of values, for example, a largest magnitude value (e.g., maximum input) following a vertical transform. Shifts (e.g., precision factors) may be determined (e.g., computed). Vertical transformation of the data may be performed. A first shift (e.g., precision factor; MidShift) may be applied after a first transform stage, for example, during forward encoding. The MidShift may be determined based on the content of the data (e.g., a largest magnitude input as opposed to a worst-case presumption). A horizontal transform of the data may be performed. A second shift (e.g., precision factor; PreQuantShift) may be applied to the transformed data. A quantization of the data may be performed. A third shift (e.g., precision factor; QuantShift) may be applied to the quantized data. Analysis and/or computation of a shift may be performed. For instance, column SAD values may be computed and/or used along with properties of a vertical transform to bound a dynamic range input to a mid-transform shift (e.g., to further improve precision).

Eq. 33 may be used to determine a constraint on a sum of shifts.

$$(\text{Shift}_{Mid}+\text{Shift}_{PreQuant}+\text{Shift}_{Quant})=(\text{Shift4}+\text{Shift5}+\text{Shift6}) \quad \text{Eq. 33}$$

A (e.g., a single) analysis stage (e.g., as shown in FIG. 10) may be used, for example, prior to (e.g., before) a (e.g., any) transform stage. An analysis may be placed after a transform stage and/or an additional analysis module may be included after the first transform. For a forward encoder, bounds (e.g., any bound(s) as described herein) may be used to determine a mid-transform shift and/or a prequantization shift. As an example, calculation of first two shifts at the encoder may be based on the bounds of Eq. 25 and/or Eq. 26. Residual data may or may not have the same structure as that used for an inverse transform. The bound in Eq. 25 may be used. When a maximum input is supported, the maximum input may be used to determine a bound on input data and/or to derive $\text{Shift}_{Mid}$ and/or $\text{Shift}_{PreQuant}$, for example, using Eq. 34.

$$B=2^{15}>\max_{k,c}|C_{k,c}| \quad \text{Eq. 34}$$

FIG. 11 illustrates an example of a flow chart of a method (1100) of an encoding operation according to the present disclosure. An encoder may obtain prediction residual data for a plurality of blocks of video data. Prediction residual data may be analyzed (e.g., to determine a magnitude input (e.g., largest) to represent a block) (1110). A first precision factor associated with a first block for performing at least one encoding function on the first block may be obtained (1120). A second precision factor associated with a second block for performing the at least one encoding function on the second block may be obtained (1130). The at least one encoding function may be performed on the first block using the first precision factor and on the second block using the second precision factor (1140). Analysis of the prediction residual data to determine a largest magnitude input to represent a block may be performed before any transformation steps (e.g., before vertical transformation).

In some examples, the present disclosure describes a signal comprising coded video data comprising quantized transform coefficients for a plurality of blocks, wherein the quantized transform coefficients are determined based on the content of the data (e.g., a magnitude input (e.g., largest)).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory; semiconductor memory devices, magnetic media such as internal hard disks and removable disks, magneto-optical media; and optical media such as CD-ROM disks; and digital versatile disks (DVDs). A processor in association with software may be used to implement a radio frequency transceiver for use in a WTRU, UE, terminal, base station, RNC, or any host computer.

The invention claimed is:

1. An apparatus comprising a processor configured to perform:
   obtaining coded video data comprising quantized transform coefficients for a plurality of blocks;
   obtaining a first content-dependent precision factor associated with a first block for performing at least one decoding function on the first block, wherein the first content-dependent precision factor is obtained based on a first magnitude of the transform coefficients associated with a first source content associated with the first block independent of a first bit-depth associated with the first block, and wherein the first content-dependent precision factor is a first minimum shift associated with reducing the first magnitude of the transform coefficients to an inverse transform processing range;
   obtaining a second content-dependent precision factor associated with a second block for performing the at least one decoding function on the second block, wherein the second content-dependent precision factor is obtained based on a second magnitude of the transform coefficients associated with a second source content associated with the second block independent of a second bit-depth associated with the second block, and wherein the second content-dependent precision factor is a second minimum shift associated with reducing the second magnitude of the transform coefficients to the inverse transform processing range; and
   performing the at least one decoding function on the quantized transform coefficients for the first block using the first content-dependent precision factor and on the quantized transform coefficients for the second block using the second content-dependent precision factor.

2. The apparatus of claim 1, wherein the first content-dependent precision factor associated with the first block and the second content-dependent precision factor associated with the second block are further obtained from the coded video data.

3. The apparatus of claim 1, wherein the first content-dependent precision factor and the second content-dependent precision factor are different.

4. The apparatus of claim 1, wherein the at least one decoding function comprises dequantization or inverse transformation, the first content-dependent precision factor comprises a first dequantization shift, the second content-dependent precision factor comprises a second dequantization shift, and the first content-dependent precision factor and the second content-dependent precision factor comprise a mid-transform shift.

5. The apparatus of claim 4, wherein obtaining the first content-dependent precision factor associated with the first block comprises determining the mid-transform shift associated with the first block based on the bounds on an absolute magnitude of an output of a first inverse transform, and the at least one decoding function comprises a second inverse transform.

6. The apparatus of claim 1, wherein the first content-dependent precision factor comprises a dequantization shift and a mid-transform shift, and wherein the mid-transform shift associated with the first block is determined based on the dequantization shift associated with the first block.

7. A method comprising:
   obtaining coded video data comprising quantized transform coefficients for a plurality of blocks;
   obtaining a first content-dependent precision factor associated with a first block for performing at least one decoding function on the first block, wherein the first content-dependent precision factor is obtained based on a first magnitude of the transform coefficients associated with a first source content associated with the first block independent of a first bit-depth associated with the first block, and wherein the first content-dependent precision factor is a first minimum shift associated with reducing the first magnitude of the transform coefficients to an inverse transform processing range;
   obtaining a second content-dependent precision factor associated with a second block for performing the at least one decoding function on the second block, wherein the second content-dependent precision factor is obtained based on a second magnitude of the transform coefficients associated with a second source content associated with the second block independent of a second bit-depth associated with the second block, and wherein the second content-dependent precision factor is a second minimum shift associated with reducing the second magnitude of the transform coefficients to the inverse transform processing range; and
   performing the at least one decoding function on the quantized transform coefficients for the first block using the first content-dependent precision factor and on the quantized transform coefficients for the second block using the second content-dependent precision factor.

8. The method of claim 7, wherein the first content-dependent precision factor associated with the first block and the second content-dependent precision factor associated with the second block are further obtained from the coded video data.

9. The method of claim 7, wherein the first content-dependent precision factor and the second content-dependent precision factor are different.

10. The method of claim 7, wherein the at least one decoding function comprises dequantization or inverse transformation, the first content-dependent precision factor comprises a first dequantization shift, the second content-dependent precision factor comprises a second dequantization shift, and the first content-dependent precision factor and the second content-dependent precision factor comprise a mid-transform shift.

11. The method of claim 10, wherein obtaining the first content-dependent precision factor associated with the first block comprises determining the mid-transform shift associated the first block based on the bounds on an absolute magnitude of an output of a first inverse transform, and the at least one decoding function comprises a second inverse transform.

12. The method of claim 7, wherein the first content-dependent precision factor comprises a dequantization shift and a mid-transform shift, and wherein the mid-transform shift associated with the first block is determined based on the dequantization shift associated with the first block.

13. An apparatus comprising a processor configured to perform:
   obtaining prediction residual data for a plurality of blocks of video data;

analyzing the prediction residual data to determine a magnitude input to represent a block;

determining a first content-dependent precision factor associated with a first block for performing at least one encoding function on the first block, wherein the first content-dependent precision factor is determined based on a first magnitude input associated with a first source content associated with the first block independent of a first bit-depth associated with the first block, and wherein the first content-dependent precision factor is a first minimum shift associated with reducing the first magnitude of the transform coefficients to an inverse transform processing range;

determining a second content-dependent precision factor associated with a second block for performing the at least one encoding function on the second block, wherein the second content-dependent precision factor is determined based on a second magnitude input associated a second source content associated with the second block independent of a second bit-depth associated with the second block, and wherein the second content-dependent precision factor is a second minimum shift associated with reducing the second magnitude of the transform coefficients to an inverse transform processing range; and performing the at least one encoding function on the input for the first block using the first content-dependent precision factor and on the input for the second block using the second content-dependent precision factor.

14. The apparatus of claim 13, wherein the at least one encoding function comprises at least one of a horizontal transform or a quantization.

15. The apparatus of claim 13, wherein the processor is further configured to further perform:

include an indication of the first content-dependent precision factor for the first block and an indication of the second content-dependent precision factor for the second block in a bitstream representing the video data.

16. The apparatus of claim 15, wherein the indication of the first content-dependent precision factor comprises a number of fraction bits for performing at least one decoding function.

17. The apparatus of claim 13, wherein analyzing the prediction residual data to determine a largest magnitude input to represent a block is performed before vertical transformation.

18. The apparatus of claim 13, wherein the first content-dependent precision factor and the second content-dependent precision factor are different.

* * * * *